Feb. 2, 1937.   J. MEIJLING ET AL   2,069,589
MACHINE FOR MANUFACTURING PAVEMENTS FROM VULCANIZABLE MATERIALS
Filed Nov. 15, 1934
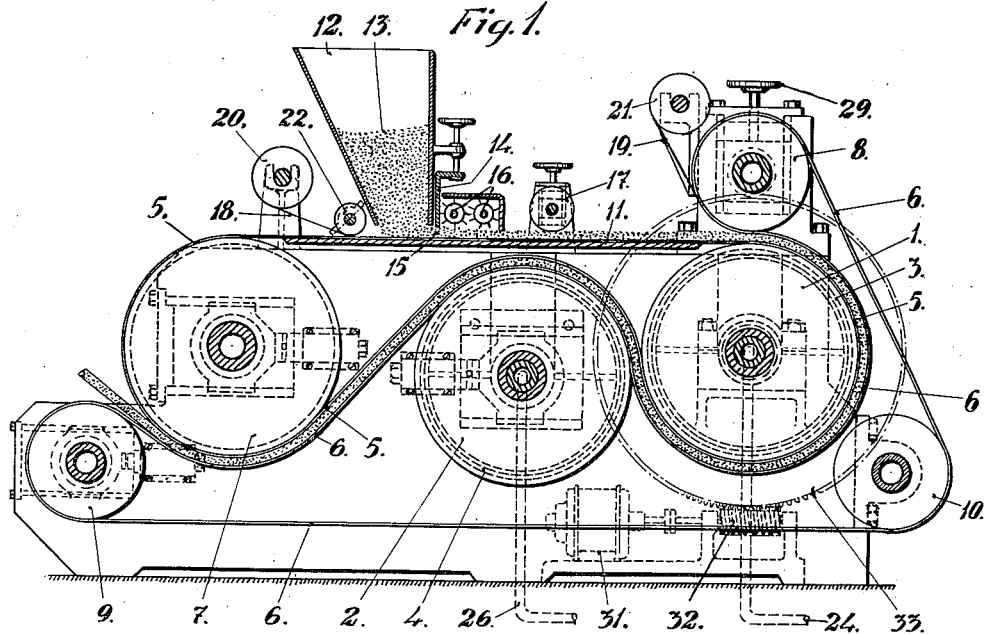
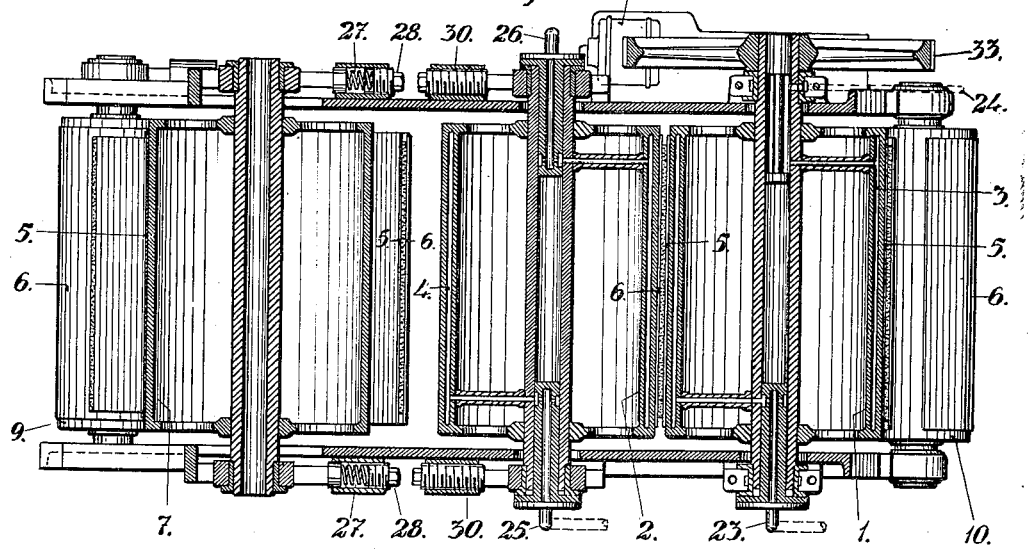
JOEL MEIJLING
THURE MAGNUSSON
INVENTORS
BY Haseltine, Lake & Co.
ATTORNEYS Patented Feb. 2, 1937

2,069,589

UNITED STATES PATENT OFFICE 2,069,589

MACHINE FOR MANUFACTURING PAVEMENTS FROM VULCANIZABLE MATERIALS

Joel Meijling and Thure Magnusson, Gothenburg, Sweden, assignors to Kooperativa Förbundet, Förening U. P. A., Stockholm, Sweden, an association of Sweden Application November 15, 1934, Serial No. 753,106
In Sweden November 17, 1933

5 Claims. (Cl. 18—6)

In the manufacture of pavements in the form of slabs, bands or mats of vulcanizable material for floors or the like, it is always necessary during a certain period to keep the continuously fed paving material in the shape it is ultimately to possess. The method hitherto practised and involving the feeding of the material between rollers or between a roller and a band in many cases yields an unsatisfactory surface on the finished pavement, owing to the difficulty of preventing a relative movement between the paving material and the roller surfaces.

The present invention relates to a method for the manufacture of such pavements, and facilitates an entirely reliable manufacture of a perfect final product. The invention is principally characterized in that the paving material is advanced between and by means of two endless bands driven at the same or approximately the same speed to a vulcanizing apparatus, in order to be formed between the bands under pressure and at the heating required for effecting the vulcanization, said bands being carried over drums, guide rollers and/or other guiding members while bearing on the material, which latter is then cooled between the bands while maintaining the same or approximately the same pressure on the material as that exerted during the vulcanization process.

The invention, which may be advantageously applied to the manufacture of pavements of any vulcanizable material available, brings about special advantages in the manufacture of such pavements which in the manufacture necessarily require heating as well as cooling. Pavements of this kind are, for instance, mixtures of vulcanizable substances, such as rubber, cautchouc or cautchouc-like material and other suitable substances apt to swell under the influence of heat, such as cork or the like.

When utilizing such materials for the manufacture of cork-rubber-mats, for example, a single roller or drum would hitherto be used for the vulcanization and cooling of said mats in the compressed state, against the cylindrical surface of which roller or drum the mat would be pressed by means of a steel band or the like during the rotation of the drum and at continuous entraining of the mat in the movement. The drum used in this operation would be provided with inner spaces or cells, into which steam for the heating and cooling water for the cooling would be introduced alternately, so that the mat or the material forming the mat would be heated when running onto the drum and bearing on a certain circumferential portion of the drum, and would then, prior to being led off the drum, be cooled on the circumferential portion of the drum lying behind the heating zone.

This process involves the drawback that great quantities of steam heat are wasted to no use by the cooling water being introduced into the same cells in which the steam heating took place the moment before, and at the same time the requisite quantity of cooling water will be very great relatively to the cooling result obtained. This disadvantage, which is considerable from an economical point of view, is also obviated effectively through the present invention which renders possible the use of separate drums for the heating and the cooling operation.

The accompanying drawing illustrates diagrammatically a form of embodiment of a means for carrying the method into effect, as applied to the manufacture of the pavements in question. Fig. 1 shows the arrangement viewed in longitudinal section, and Fig. 2 is a horizontal section of the same on line A—B in Fig. 1.

According to the drawing, the apparatus comprises a machine having two drums rotatably mounted in a frame. One of these drums constitutes a heating drum 1, and is to this end provided with an inner, preferably annular space 3 along the cylindrical surface for the heating of the latter by means of steam or the like, whereas the second drum constitutes a cooling drum 2 having an inner, preferably annular space 4 along the cylindrical surface for the cooling of the latter, preferably by means of cooling water. The heating steam may be supplied to the one end of the shaft of the heating drum 1 through a supply conduit 23, and is then conducted to the one end of the space 3, as indicated in Fig. 2, in order then to be drawn off through the opposite end of the space, perhaps in the form of condensate, and to be led off through the outlet conduit 24 connected to the other end of the shaft. In a similar manner the cooling medium is supplied to the inner space 4 of the cooling drum 2 through a supply conduit 25 connected to the one end of the shaft of the drum, and is led therefrom through the same shaft and an outlet conduit 26 connected to the other end thereof.

Two endless pressure bands 5, 6 of steel or other material run together over the drums 1 and 2, said bands being guided by a suitable number of guide or break rollers 7, 8, 9 and 10 or the like. Here, the band 5 runs along the upper surface of a table 11 or other basement provided above the drums, and is led from here onto the heating drum 1 disposed at the front end of the table, at the upper portion thereof, between this portion and the guide roller 8 disposed above the drum, said band then following the cylindrical surface of the drum to about three quarters of the circumference of the drum, the band then passing over to the upper portion of the cylindrical surface of the cooling drum 2 located behind the heating drum beneath the table, in order then to be led back again to the rear end of the table 11 by means of the guide roller 7 disposed behind the cooling drum. The other pressure band 6 is advanced from the guide roller 8 to the heating drum at the entry place of the first-mentioned pressure band 5, and follows this pressure band about the two drums 1 and 2 and partly about the guide roller 7, whence the band 6 is led off earlier than the band 5 by means of the guide roller 9 located at the bottom behind the guide roller 7, in order then to be led back from the guide roller 9 to the guide roller 8 through the medium of the guide roller 10 disposed at the bottom in front of the heating drum. The guide rollers 7 and 9 are preferably arranged as tension rollers, the roller 7 for the tensioning of the pressure band 5 and the roller 9 for the tensioning of the pressure band 6, and for this purpose the bearings of the rollers are displaceably arranged in the frame and adapted to be actuated by springs 27 adapted to be controlled by means of screws 28, in a manner clearly disclosed in Fig. 2 of the drawing. By means of screws provided with hand-wheels 29, which actuate the bearings of the guide roller 8 movable in the frame, the guide roller is adjustable in a direction toward the heating drum to control the entry space between the roller and the drum. In addition, the drums 1 and 2 should be adjustable relatively to each other, which in the present embodiment is exemplified by an adjusting means at the cooling drum 2, which like the arrangement just described is provided by screws 30 bearing against the bearings of the drum which are movable in the frame. The cooling drum is preferably adjusted to be located so near the heating drum 1 that the pressure bands 5, 6 will immediately pass over from the surface of the heating drum to that of the cooling drum. Through the adjustment of the cooling drum the distance between the pressure bands, that is to say the thickness of the layer of material advanced between the bands, can also be controlled.

According to the drawing, the heating drum 1 is driven from an electric motor 31 through the medium of a worm gearing 32, 33, it being then possible to make the friction produced by the tension of the two bands between the drum 1 and the band 5, between the latter and the paving material located on the outside thereof, and between this paving material and the band 6, sufficient, by the selection of a sufficient tension, to cause the bands and the intermediate material to be driven without the use of other driving members, such as transmission means, and without any displacement whatever taking place between the bands and the paving material.

Provided above the table or the pressure band 5 running along the table is a funnel-like container 12, which is open at the bottom and adapted to receive a mixture of the material 13, such as finely divided cork and rubber, out of which the paving in question is to be manufactured, and at the movement of the band 5 a layer of this material resting on the band is entrained out through an opening 15 in the front wall of the container, said opening 15 being located beside the band and adapted to be controlled with respect to the size thereof by means of an adjustable damper 14, there being provided outside the said opening, rollers 16 covered with bristles 16 for the smoothening of the layer, and a packing roller 17 for the packing of the layer. With the pressure band 5 the layer of material is brought onto the heating roller between the band 5 and the other pressure band 6 running over the guide roller 8 at the same location at the same or approximately the same speed over the heating roller.

In order that the layer of material shall not come into direct contact with the pressure bands 5 and 6, other bands 18, 19 of paper, fabric, pasteboard, tarred paper or the like may be run down from rolls 20 and 21 respectively rotatably mounted above the table. The roll 20 is then disposed behind the container 12, and the band 18 is taken down on the upper side of the pressure band 5 with the aid of a guide roller 22, before the pressure band has reached as far as beneath the said container. The other roll 21 is disposed in front of the table in the proximity of the guide roller 8, so that the band 19 is taken down from the roll against the pressure band 6 and is caused to follow the latter in between the guide roller and the heating drum 1.

In the manufacture of the cork-rubber-mat, the drums and the guide rollers are brought into rotation by means of the electric motor 31, and steam or the like is admitted to the heating drum 1 through the conduit 23, besides which cooling water is supplied to the cooling drum 2 through the conduit 25. The layer of material coming from the container 12 will now be continuously led in, as above described, between the two pressure bands 5 and 6 at the place of entry on the heating drum 1, between the latter and the guide roller 8, which has been adjusted to be located at a distance from the drum corresponding approximately to the thickness of the cork-rubber-mat in a finished state. For this reason the material is compressed at the place of entry to this thickness, and is then entrained with the bands about the heating drum, in which the vulcanization takes place, and about the cooling drum to be cooled as required, whereupon the finished pavement is led off, preferably at the point between the guide rollers 7 and 9 where the pressure bands are again separated. By the feature that the pressure bands are tensioned to the required extent by means of the guide rollers 7 and 9, the material will, throughout the path of movement thereof between the pressure bands, from the place of entry at the heating drum to the point of discharge behind the cooling drum, be kept together between the said pressure bands while maintaining the thickness imparted thereto at the place of entry, or while being, perhaps, subjected to a reduction of said thickness. If during the manufacture the protecting bands 18 and 19 are also led in on both sides of the material, the latter will not be brought into direct contact with the pressure bands, and is thus prevented from sticking to the latter. The paving having been finished, one or both of the protecting bands, as desired, may be ground off, or, if they do not stick to the paving, they may be removed from the same without any special subsequent treatment.

The details of the arrangement may obviously be subjected to alterations, without the principle of the invention being departed from. Thus a plurality of drums and guide rollers may be utilized should this be found suitable for special manufactures, and likewise other means for the advancement of the material to the place of entry between the pressure bands than those hereinbefore described may be brought into use. For the operation of the machine, the motor 31 may be coupled to the cooling drum 2, the roller 8, or to any one of the guide rollers, instead of to the heating drum 1. Besides, it may be found suitable in certain cases for the driving of the drums or the guide rollers to connect them with each other by means of toothed gearings or chain drives, for example. The method may also be advantageously applied to the manufacture of pavements of vulcanizable material, which for the vulcanization and cooling under pressure is supplied to the heating drum 1 otherwise than in a disintegrated form, for instance in the shape of slabs, bands or the like preworked to a greater or lesser extent. The method may thus also be utilized for the manufacture of a slab-like or band-shaped paving material consisting of a plurality of parts vulcanized together at their edges or to a substratum, in which case the container 12 disposed above the table 11 with the appertaining means are dispensed with, so as to provide the necessary space for the arrangement of the parts in question beside one another on the band 5 advanced over the table.

What we claim is:—

1. A machine for manufacturing pavements in the form of slabs, bands or mats for the covering of floors or the like from vulcanizable material such as rubber, cork-rubber mixture or the like, comprising two endless bands running together over a number of rotatably mounted drums, guiding members for leading said bands onto one of said drums, means for supplying said vulcanizable material in the form of a layer between said bands, heating means in one of the drums conditioning the same for vulcanizing the material between the bands during its passage over said drum, cooling means in a subsequent drum for cooling the vulcanized material between the bands, and means causing the material advanced between the bands to be subjected to pressure, said drums and guiding members being so relatively disposed and spaced with respect to each other that substantially the same pressure is continuously and without interruption maintained on the material during its transportation between the bands over the heated and cooled drums and between said drums.

2. A machine for manufacturing pavements in the form of slabs, bands or mats for the covering of floors or the like from vulcanizable material such as rubber, cork-rubber mixture or the like, comprising two endless bands running together over a rotatably mounted vulcanizing drum and a separate drum provided with cooling means, means for supplying said vulcanizable material in the form of a layer between said bands, guiding members cooperating with the two endless bands by which the material is advanced, so as to cause the bands to run together over the vulcanizing drum, and means causing the material transported between said bands to be subjected to pressure and heat while travelling upon said vulcanizing drum, said drums and guiding members being so relatively disposed and spaced with respect to each other that during rotation of the drums the bands are passed over from the vulcanizing drum to the cooling drum and the pressure on the material located between the bands is uninterruptedly and continuously maintained at approximately the same uniform value as the pressure exerted upon the material when passing over the vulcanizing drum.

3. A machine for manufacturing pavements in the form of slabs, bands or mats for the covering of floors or the like from vulcanizable material such as rubber, cork-rubber mixture or the like, comprising two endless bands running together over a rotatably mounted vulcanizing drum and a distinct drum provided with cooling means, means for supplying said vulcanizable material in a layer between said bands, guiding members cooperating with the two endless bands by which the material is advanced, so as to cause the bands to run together over the vulcanizing drum, and means causing the material transported between said bands to be subjected to pressure and heat, while travelling upon said vulcanizinging drum, said drums being so relatively disposed and spaced in mutually proximate positions that the two bands, between which the material is carried will run together in the form of an S about said drums and that the distance between said bands approximately will correspond to the intended thickness of the vulcanized material, the drums and guiding members being also so relatively disposed with respect to each other, that during rotation of said drums the bands are passed over from the vulcanizing drum to the cooling drum and the pressure on the material located between the bands is uninterruptedly and continuously maintained at approximately the same uniform value as the pressure exerted upon the material when passing over the vulcanizing drum.

4. A machine for manufacturing pavements in the form of slabs, bands or mats for the covering of floors or the like from vulcanizable material such as rubber, cork-rubber mixture or the like, comprising two endless bands running together over a rotatably mounted vulcanizing drum and a distinct drum provided with cooling means, means for supplying said vulcanizable material in the form of a layer between said bands, guiding members cooperating with the two endless bands by which the material is advanced, so as to cause the bands to run together over the vulcanizing drum, means causing the material transported between the bands to be subjected to pressure and heat while travelling upon said vulcanizing drum, said drums and guiding members being so relatively disposed and spaced with respect to each other that during rotation of the drums the bands are passed over from the vulcanizing drum to the cooling drum and the pressure on the material located between the bands is uninterruptedly and continuously maintained at approximately the same uniform value as the pressure exerted upon the material when passing over the vulcanizing drum, a guide roller mounted at the point of initial engagement of the two bands with the vulcanizing drum and serving to guide and lead the outer band onto said drum, and means for adjusting the position of said roller toward or from said vulcanizing drum in order to control the distance and spacing between the bands at said point of initial engagement.

5. A machine for manufacturing pavements in the form of slabs, bands or mats for the covering of floors or the like from vulcanizable material such as rubber, cork-rubber mixture or the like, comprising two endless bands running together over a rotatably mounted vulcanizing drum and a distinct drum provided with cooling means, means for supplying said vulcanizable material in the form of a layer between said bands, guiding members cooperating with the two endless bands by which the material is advanced, so as to cause the bands to run together over the vulcanizing drum, means causing the material transported between said bands to be subjected to pressure and heat while travelling upon said vulcanizing drum, said drums and guiding members being so relatively disposed and spaced with respect to each other that during rotation of the drums the bands are passed over from the vulcanizing drum to the cooling drum and the pressure on the material located between the bands is uninterruptedly and continuously maintained at approximately the same uniform value as the pressure exerted upon the material when passing over the vulcanizing drum, and two band rolls of web material rotatably mounted in such proximate positions to the drums as to supply from said rolls a pair of web bands individually to the inner opposed surfaces of said two endless bands in order to cover and protect the same while said bands run together over the drums.

JOEL MEIJLING.
THURE MAGNUSSON.